UNITED STATES PATENT OFFICE.

ALBERTO DILLON DE MICHEROUX, OF MARSEILLES, FRANCE.

FUEL COMPOSITION.

SPECIFICATION forming part of Letters Patent No. 648,042, dated April 24, 1900.

Application filed July 19, 1897. Serial No. 645,124. (No specimens.)

*To all whom it may concern:*

Be it known that I, ALBERTO DILLON DE MICHEROUX, of Marseilles, France, have invented a certain new and useful Improved Fuel and Composition for Producing the Same, of which the following is a specification.

The object of this invention is to produce an improved fuel, preferably in the form of bricks, having coal, peat, or similar material for its chief constituent, but without sulfurous odor during combustion and having a high degree of efficacy for heating and lighting, while cheap and easily manufactured.

To this end I mix with water, gradually raised in temperature to the boiling-point, a quantity of one or more of the organic hydrocarbon derivatives—such as cerotic, margaric, or stearic acids—turpentine, or the so-called "mineral oils," using one or more of these singly or mixed, whether acid or alkaline, as required. This mixture being liquefied and about to boil, I add, while lowering the fire, protoxid of iron and dolomite, both finely powdered, and liquid lime, soda, or other alkaline substance or substances used by soap-boilers. The dolomite is used as the most convenient way of supplying carbonate of magnesia. I stir the mass, pouring slowly in the lime, which is the last of the ingredients. When cooled, the mixture forms a mass which may be preserved until needed. If required for immediate use, cooling is unnecessary. The coal, coke, peat, or other dense hydrocarbon fuel is preferably dried and powdered, and the mass above described is mixed therewith. Bricks may be molded from the mixture thus resulting for convenience of use and afterward coated with any suitable silicate, such as silicate of soda. In making such bricks the mass of hydrocarbon derivative, carbonate of magnesia, and lime may be used without the comminuted fuel and with no more than from five to ten per cent. of coal-tar or petroleum instead; but I prefer for most uses to mix the desiccated comminuted fuel with the other materials, as above.

The proportions preferably used are eighty-two to ninety-eight parts in volume of the coal-dust, comminuted peat, or other like fuel; two to eighteen parts of the cerotic acid, mineral oil, or their substitutes above mentioned; from two to six parts of dolomite or carbonate of magnesia; from two to eight parts of protoxid of iron, and from six to twelve parts of liquid lime.

Having thus described my invention, what I claim as new, and desire to secure by Letters Patent, is—

A composition of matter for fuel consisting of coal-dust, cerotic acid, protoxid of iron, carbonate of magnesia, and liquid alkali in about the proportions stated.

In testimony that I claim the foregoing as my invention I have signed my name in the presence of two subscribing witnesses.

ALBERTO DILLON DE MICHEROUX.

Witnesses:
  A. STURM,
  GREGORY PHELAN.